(12) United States Patent
Kim

(10) Patent No.: US 9,638,534 B2
(45) Date of Patent: May 2, 2017

(54) ARRIVAL TIME NOTIFICATION SYSTEM USING SMART GLASSES AND METHOD THEREOF

(71) Applicant: HYUNDAI MOTOR COMPANY, Seoul (KR)

(72) Inventor: Hyun Min Kim, Gwangmyeong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/931,586

(22) Filed: Nov. 3, 2015

(65) Prior Publication Data

US 2016/0169691 A1    Jun. 16, 2016

(30) Foreign Application Priority Data

Dec. 16, 2014  (KR) .................. 10-2014-0180964

(51) Int. Cl.
| | | |
|---|---|---|
| G01C 21/12 | (2006.01) | |
| G09G 5/00 | (2006.01) | |
| G06Q 10/00 | (2012.01) | |
| G01C 21/34 | (2006.01) | |
| G02B 27/01 | (2006.01) | |
| G06F 3/16 | (2006.01) | |

(52) U.S. Cl.
CPC ....... *G01C 21/3407* (2013.01); *G02B 27/017* (2013.01); *G02B 27/0179* (2013.01); *G02B 2027/014* (2013.01); *G02B 2027/0178* (2013.01); *G02B 2027/0187* (2013.01); *G06F 3/167* (2013.01)

(58) Field of Classification Search
USPC .................... 701/465; 345/8; 705/5
See application file for complete search history.

(56) References Cited

U.S. PATENT DOCUMENTS

| | | | |
|---|---|---|---|
| 8,965,460 B1* | 2/2015 | Rao .................. | G06F 3/005 455/566 |
| 2014/0009623 A1 | 1/2014 | Lai et al. | |
| 2014/0375477 A1* | 12/2014 | Jain ................... | H04W 4/008 340/933 |
| 2015/0029227 A1* | 1/2015 | Park ................. | G06F 1/1613 345/659 |

(Continued)

FOREIGN PATENT DOCUMENTS

| | | |
|---|---|---|
| JP | 2004-226302 A | 8/2004 |
| JP | 2005-037181 A | 2/2005 |

(Continued)

OTHER PUBLICATIONS

Office Action issued in corresponding Korean Application No. 10-2014-0180964, dated Feb. 25, 2016.

(Continued)

*Primary Examiner* — Tyler Paige
(74) *Attorney, Agent, or Firm* — McDermott Will & Emery LLP

(57) ABSTRACT

An arrival time notification system includes smart glasses including a recognition unit configured to recognize current time according to the view of a driver driving a vehicle, and a head unit configured to inform of an arrival time at a destination through the time recognized from the smart glasses.

8 Claims, 3 Drawing Sheets

(56) References Cited

U.S. PATENT DOCUMENTS

| | | | |
|---|---|---|---|
| 2015/0128023 A1* | 5/2015 | Goldstein | G06F 17/30899 715/234 |
| 2015/0164430 A1* | 6/2015 | Hu | A61B 5/7264 600/595 |
| 2015/0170531 A1* | 6/2015 | Hu | G09B 5/00 434/236 |
| 2015/0199780 A1* | 7/2015 | Beyk | G06Q 50/184 705/310 |
| 2015/0286959 A1* | 10/2015 | Hauviller | G06Q 10/02 705/5 |
| 2015/0317569 A1* | 11/2015 | Renaudie | G06Q 10/02 705/5 |
| 2015/0351681 A1* | 12/2015 | Lee | A61B 5/4806 600/595 |
| 2015/0370072 A1* | 12/2015 | Lee | G02B 27/0172 345/8 |
| 2016/0011420 A1* | 1/2016 | Jang | G02B 27/0172 345/8 |

FOREIGN PATENT DOCUMENTS

| | | |
|---|---|---|
| JP | 2006-071500 A | 3/2006 |
| JP | 2009-139145 A | 6/2009 |
| JP | 2012-079138 A | 4/2012 |
| KR | 10-2010-0077993 A | 7/2010 |
| KR | 10-1284797 B1 | 7/2013 |
| KR | 10-2013-0098514 A | 9/2013 |
| KR | 10-1398946 B1 | 5/2014 |

OTHER PUBLICATIONS

Notice of Allowance received in corresponding Korean Application No. 10-2014-0180964, dated Aug. 24, 2016.

* cited by examiner

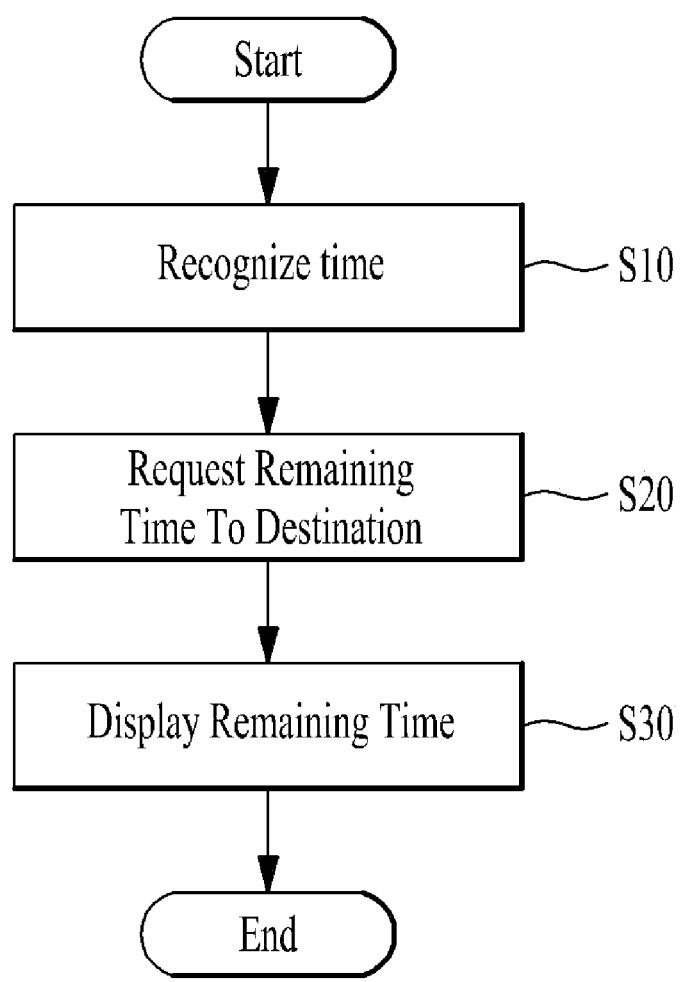

ARRIVAL TIME NOTIFICATION SYSTEM USING SMART GLASSES AND METHOD THEREOF

CROSS-REFERENCE OF RELATED APPLICATION

This application claims the benefit of Korean Patent Application No. 10-2014-0180964, filed on Dec. 16, 2014 with the Korean Intellectual Property Office, the disclosure of which is hereby incorporated by reference as if fully set forth herein.

BACKGROUND OF THE INVENTION

Field of the Invention

The present invention relates to an arrival time notification system using smart glasses and a method thereof, and more particularly, to an arrival time notification system using smart glasses and a method thereof in which current time is acquired during driving through smart glasses and a driver is notified of a remaining time to a set destination.

Discussion of the Related Art

According to remarkable development in information communication and electronic devices, measurement devices are gradually miniaturized and developed from a portable type to a wearable type. That is, a user may wear measurement devices of wristwatch, ring, necklace, and glasses types on parts of the body to frequently measure a target.

In order to variously apply wearable measurement devices and to extend functions of wearable measurement devices, a function module, such as a communication module or a measurement device, may be added to the wearable measurement devices.

Further, development to control the electric field of a vehicle or to acquire the information of a navigation system provided in the vehicle is increasingly underway and a remaining time to a set destination of the navigation system is provided. However, the remaining time to the destination may be provided at a time undesired by a driver.

PRIOR ART DOCUMENT

Patent Document

Korean Patent Laid-open Publication No. 10-2004-0050550 (Jun. 16, 2004)

SUMMARY OF THE INVENTION

Accordingly, the present invention is directed to an arrival time notification system using smart glasses and a method thereof that substantially obviate one or more problems due to limitations and disadvantages of the related art.

An object of the present invention is to provide an arrival time notification system using smart glasses and a method thereof in which current time is acquired through smart glasses according to a set destination in a navigation system provided in a vehicle and a driver is notified of a remaining time to the destination.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an arrival time notification system using smart glasses includes smart glasses including a recognition unit configured to recognize current time according to the view of a driver riding in a vehicle and a head unit configured to inform of an arrival time at a destination through the time recognized from the smart glasses.

The arrival time notification system using smart glasses may further include a smart watch configured to inform of the current time.

The smart watch may include a first gyrosensor configured to recognize movement of a wrist of the driver to sense whether or not the smart watch is near the driver's view.

The smart glasses may be configured to communicate with the head unit through a Wi-Fi or Bluetooth communication scheme so as to transmit time acquired in real time from the driver to the head unit.

The smart glasses may further include a sensor unit configured to acquire time information acquired from the smart watch according to the driver's view.

The sensor unit may be configured to recognize the viewing direction of the driver and to acquire current time information if the viewing direction of the driver is stopped for a determined time or more.

The sensor unit may include a second gyrosensor configured to sense the viewing direction of the driver according to a set angle to monitor movement of the driver.

The sensor unit may further include a voice recognition sensor configured to control the smart glasses from a voice command of the driver.

The head unit may include a display unit configured to receive information indicating that the driver confirms time through the smart glasses and to inform of a remaining time to the set destination through an image or voice displayed or output by the display unit.

In another aspect of the present invention, an arrival time notification method using smart glasses includes recognizing current time by recognizing the viewing direction of a driver or a driver's view during driving through smart glasses, requesting a remaining time to a destination according to the current time recognized in the recognition of the current time, and reading a distance to the destination set in the request of the remaining time and informing of the remaining time to the destination through an image or voice displayed or output by a display unit.

In still another aspect of the present invention, an arrival time notification system includes a smart watch including a motion sensor and acquiring time information in accordance with a movement of the smart watch detected by the motion sensor, smart glasses including a view recognition unit, acquiring the time information from the smart watch in response to a view of the smart watch recognized by the recognition unit, and transmitting the acquired time information to a head unit of a vehicle, and the head unit determining an arrival time at a destination through the received time information from the smart glasses and outputting the arrival time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart illustrating an arrival time notification method using smart glasses in accordance with the present invention.

DETAILED DESCRIPTION OF THE INVENTION

Figure 1:
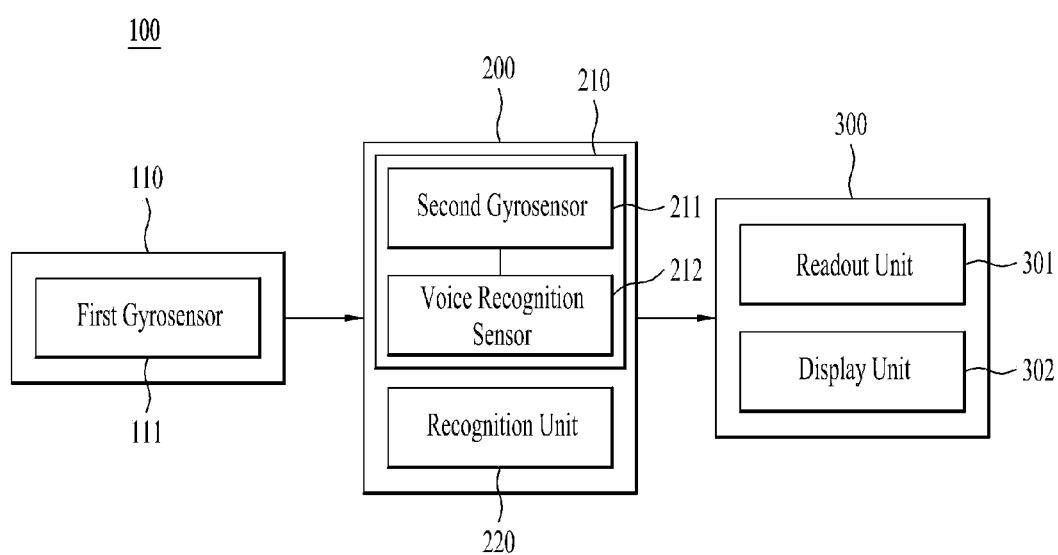
FIG. 1 is a block diagram of an arrival time notification system using smart glasses in accordance with the present invention.

Reference will now be made in detail to the preferred embodiments of the present invention, examples of which are illustrated in the accompanying drawings. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear. Some features proposed in the drawings are enlarged, reduced or simplified for ease of description, and elements in the drawings are not illustrated at the appropriate rate always. However, they will be apparent to those skilled in the art.

Figure 2:
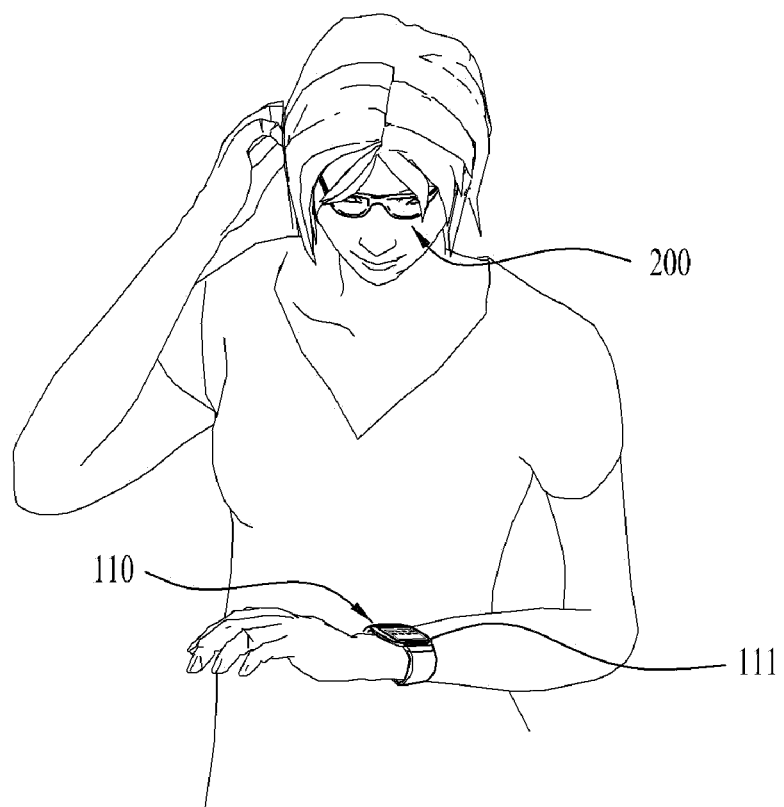
FIG. 2 is a view exemplarily illustrating the arrival time notification system using smart glasses in accordance with the present invention.

FIG. 1 is a block diagram of an arrival time notification system using smart glasses in accordance with the present invention, FIG. 2 is a view exemplarily illustrating the arrival time notification system using smart glasses in accordance with the present invention, and FIG. 3 is a flowchart illustrating an arrival time notification method using smart glasses in accordance with the present invention.

As exemplarily shown in FIGS. 1 and 2, an arrival time notification system 100 using smart glasses includes a smart watch 110, smart glasses 200, and a head unit 300.

The smart glasses 200 acquire time information of the smart watch 110 according to a driver's view and include a sensor unit 210 to acquire time information from the smart watch 110 according to the driver's view. The sensor unit 210 includes a second gyrosensor 211 to detect the viewing direction of the driver and to acquire current time information when the viewing direction of the driver is stopped for a predetermined time or longer, and a voice recognition sensor 212. A recognition unit 220 of the smart glasses recognizes the smart watch 110 at which the driver gazes and acquires current time provided from the smart watch 110.

The head unit 300 includes a readout unit 301 to receive time information acquired from the smart glasses 200 and to calculate an arrival time at a destination set in the head unit 300 and a display unit 302 to output or display voice or an image to inform the driver of the arrival time calculated through the readout unit 301.

The smart watch 110 may display a pairing interface to set whether or not pairing between the smart watch 110 and the smart glasses 200 is released on a display unit. For example, if the smart watch 110 detects an input signal regarding release of pairing, the smart watch 110 may release pairing with the smart glasses 200. Here, the smart watch 110 may display an indicator indicating release of pairing on the display unit.

Further, if the smart watch 110 detects a wearing release signal, the smart watch 110 may release pairing with the smart glasses 200 without display of the pairing interface on the display unit according to automatic settings.

Therefore, through pairing between the smart watch 110 and the smart glasses 200, if the driver views the smart watch 110, the smart watch 110 transmits a signal regarding current time provided from the smart watch 110 to the smart glasses 200 and thus the smart glasses 200 acquire information regarding the current time.

The smart watch 110 includes a first gyrosensor 111 to acquire current time information. The first gyrosensor 111 may recognize the motion of the driver, i.e., detect movement of a wrist of the driver, and acquire information regarding current time if the wrist of the driver moves near the driver's view.

The smart glasses 200 may recognize movement of a head of the driver from the second gyrosensor 211 and thus detect a direction and acquire current time, if the driver's view stops at the position of the smart watch 110 within a predetermined time or longer.

Further, the smart glasses 200 may be controlled through the voice recognition sensor 212 recognizing the voice of the driver. The voice recognition sensor 212 may read specific acoustic waves acquired from the voice of the driver, analyze the acoustic waves, and thus selectively control the smart glasses 200 through the analyzed acoustic waves.

For example, the voice recognition sensor 212 may recognize voice input from the driver and thus perform a voice recognition operation to execute various functions of an electronic device, and perform a dictation function of converting input voice into character strings and displaying the character strings according to execution of the function of the electronic device. The voice recognition sensor 212 may include a sound recorder, an engine manager, a speech recognition engine and the like.

Thereby, the voice recognition sensor 212 controls the smart glasses 200 using the voice of the driver. For example, when the driver inputs a voice command of "current time", current time information may be acquired from the smart watch 110. That is, current time information may be more conveniently collected from the smart watch 110.

Further, the smart glasses 200 may acquire current time information by recognizing whether or not the smart watch 110 is sensed within the driver's view or recognizing the shape of the smart watch 110 through the recognition unit 220.

The head unit 300 may include a storage (not shown) to store a map database in which map data of a national map and path guide data relating to the map data are provided and a road section database in which road related information including roads of the national map and detailed road sections of the respective roads is provided. Further, the storage (not shown) may store a path guide control program to control the overall operation of the head unit 300 including a path guide function and a path search control program to provide road search environments to search paths.

The head unit 300 mutually communicates with the smart glasses 200 in real time through Wi-Fi or Bluetooth communication in order to acquire current time information provided in real time from the smart glasses 200. Through such mutual communication, information regarding current time acquired from the smart glasses 200 is transmitted to the head unit 300 in real time.

However, the disclosure is not limited to these communication schemes and any communication scheme to transmit data in real time may be used.

The head unit 300 includes the readout unit 301 to receive time information acquired from the smart glasses 200 and to calculate an arrival time at a destination set by the driver. The readout unit 301 may calculate a distance between two points, i.e., a current position and the destination, and thus calculate the arrival time through calculation of the azimuth angle of a position input as a starting point.

Therefore, the head unit 300 may inform the driver of the arrival time calculated by the readout unit 301 through an image or voice displayed or output by the display unit 302.

Hereinafter, an arrival time notification method using the above-described arrival time notification system 100 using smart glasses 200 will be described in detail.

As exemplarily shown in FIG. 2, the arrival time notification system 100 includes the smart watch 110 informing of current time, the smart glasses 200 recognizing the current time according to the driver's view, and the head unit 300 informing of an arrival time at a set destination through the time recognized from the smart glasses 200.

The arrival time notification method includes recognizing current time provided from the smart watch 110 by recognizing the viewing direction of the driver or the driver's view during driving through the smart glasses 200 (Operation S10), requesting an arrival time at a destination according to the current time recognized in Operation S10 (Operation S20), and reading a distance to the destination set in Operation S20 and informing of the arrival time at the destination through an image or voice displayed or output by the display unit 302 (Operation S30).

In Operation S10, if the driver views the smart watch 110 through pairing between the smart watch 110 and the smart glasses 200, a signal regarding current time provided from the smart watch 110 is transmitted to the smart glasses 200.

Further, in Operation S10, the motion of the driver is recognized, i.e., movement of a wrist of the driver is detected, through the smart watch 110 and, if the wrist of the driver moves near the driver's view, information regarding current time is acquired.

Thereafter, in Operation S10, the viewing direction of the driver is detected by recognizing movement of the head of the driver from the second gyrosensor 211, and whether or not the smart watch 110 is sensed within the driver's view or the shape of the smart watch 110 is recognized through the recognition unit 220 of the smart glasses 200 and thus current time information is acquired.

In Operation S20, by determining the current time acquired from the smart watch 110 or determining whether or not the smart watch 110 is located within a predetermined area through the smart glasses 200, an expected arrival time at a destination set in the head unit 300 is requested.

Further, in Operation S20, a distance between two points, i.e., a current position and the destination, is calculated through the readout unit 301 provided in the head unit 300 and thus an arrival time is acquired through calculation of the azimuth angle of a position input as a starting point.

In Operation S30, the driver is informed of the arrival time calculated by the readout unit 301 through an image or voice displayed or output by the display unit 302.

As apparent from the above description, an arrival time notification system using smart glasses and a method thereof may acquire a remaining time to a destination, if needed by a driver, without disturbance to driving when the driver drives a vehicle while wearing smart glasses.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An arrival time notification device engaged with smart glasses, comprising:
    a head unit configured to provide an estimated arrival time regarding a destination through a first time recognized by, and transferred from, the smart glasses,
    wherein the first time is a time when the smart glasses are focused on a smart watch in a vehicle,
    wherein the head unit receives a signal of indicating a movement of the smart watch from the smart glasses,
    wherein the smart watch includes a first gyrosensor configured to recognize movement of a wrist of the driver to sense whether or not the smart watch is near the driver's view, and
    wherein the head unit includes a readout unit to receive time information acquired from the smart glasses and to calculate an arrival time at a destination set in the head unit.

2. The arrival time notification device using smart glasses according to claim 1, wherein the smart watch provides the first time to the head unit.

3. The arrival time notification device using smart glasses according to claim 1, wherein the smart glasses are configured to communicate with the head unit through a WI-FI or BLUETOOTH communication scheme so as to transmit time acquired in real time from the smart glasses to the head unit.

4. The arrival time notification device using smart glasses according to claim 1, wherein the smart glasses further include a sensor unit configured to acquire time information acquired from the smart watch according to the driver's view.

5. The arrival time notification device using smart glasses according to claim 4, wherein the sensor unit is configured to recognize the viewing direction of the driver and to acquire current time information if the viewing direction of the driver is stopped for a determined time or longer.

6. The arrival time notification device using smart glasses according to claim 5, wherein the sensor unit includes a second gyrosensor configured to sense the viewing direction of the driver according to a set angle to monitor movement of the driver.

7. The arrival time notification device using smart glasses according to claim 6, wherein the sensor unit further includes a voice recognition sensor configured to control the smart glasses by a voice command of the driver.

8. The arrival time notification device using smart glasses according to claim 1, wherein the head unit includes a display unit configured to receive information indicating that the driver confirms time through the smart glasses and to inform of a remaining time to the set destination through an image or voice displayed or output by the display unit.

* * * * *